(12) United States Patent
Kiehtreiber

(10) Patent No.: US 8,782,807 B2
(45) Date of Patent: *Jul. 15, 2014

(54) SYSTEM AND METHOD FOR AUTHENTICATING CODE EXECUTING ON COMPUTER SYSTEM

(71) Applicant: Apple Inc., Cupertino, CA (US)

(72) Inventor: Peter Kiehtreiber, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,030

(22) Filed: Feb. 4, 2013

(65) Prior Publication Data

US 2013/0145456 A1    Jun. 6, 2013

Related U.S. Application Data

(63) Continuation of application No. 11/620,599, filed on Jan. 5, 2007, now Pat. No. 8,375,458.

(51) Int. Cl.
| | | |
|---|---|---|
| *G06F 7/04* | (2006.01) | |
| *G06F 17/30* | (2006.01) | |
| *H04N 7/16* | (2011.01) | |
| *G06F 21/52* | (2013.01) | |
| *G06F 21/12* | (2013.01) | |
| *G06F 21/50* | (2013.01) | |
| *G06F 21/51* | (2013.01) | |
| *G06F 11/00* | (2006.01) | |
| *G06F 12/14* | (2006.01) | |
| *H04L 29/06* | (2006.01) | |
| *G06F 9/44* | (2006.01) | |

(52) U.S. Cl.
CPC .............. *G06F 21/52* (2013.01); *G06F 21/12* (2013.01); *G06F 21/50* (2013.01); *G06F 21/51* (2013.01)
USPC .............. 726/30; 726/22; 713/165; 713/187; 717/126; 717/127; 717/131

(58) Field of Classification Search
CPC .................... G06F 21/12; G06F 21/50–21/52; G06F 21/121
USPC ........ 726/22, 24, 26; 713/160, 161, 165, 187; 717/120, 126, 127, 131
See application file for complete search history.

(56) References Cited

U.S. PATENT DOCUMENTS

| | | | |
|---|---|---|---|
| 6,802,006 B1 * | 10/2004 | Bodrov | 713/187 |
| 7,103,779 B2 | 9/2006 | Kiehtreiber et al. | |

(Continued)

FOREIGN PATENT DOCUMENTS

| | | |
|---|---|---|
| EP | 0752786 | 1/1997 |
| WO | 01/63385 | 8/2001 |

(Continued)

OTHER PUBLICATIONS

Davida, George I., et al., "Defending Systems Against Viruses through Cryptographic Authentication", Electrical Engineering and Computer Science Department University of Wisconsin-Milwaukee, Month Unknown, 1989, pp. 312-318, IEEE, Milwaukee, WI.

(Continued)

*Primary Examiner* — Evans Desrosiers
*Assistant Examiner* — Daniel Potratz
(74) *Attorney, Agent, or Firm* — Adeli LLP

(57) ABSTRACT

A code authentication architecture is used to sign code by adding one or more digital signatures to it. The digital signatures identify what authority signed the code, what the code contains, what type of program the code is, or other identifying information. When the signed code is later executed on a computer system, its identity is obtained by accessing encrypted information of the code stored on disk. The architecture then determines whether the identity satisfies at least one requirement imposed on the code for some purpose. If the code has been altered from when it was signed or it fails to satisfy a requirement imposed, the code will not have a valid identity. In addition to verifying the identity of the code, the architecture also validates executing code immediately responsible for managing the code and additional executing code in a chain of hosts responsible for managing one another.

21 Claims, 4 Drawing Sheets

(56) References Cited

U.S. PATENT DOCUMENTS

| | | | |
|---|---|---|---|
| 7,376,977 B2 | 5/2008 | Jindal et al. | |
| 7,577,848 B2 | 8/2009 | Schwartz et al. | |
| 7,647,647 B2 * | 1/2010 | Schultz | 726/29 |
| 7,669,238 B2 | 2/2010 | Fee et al. | |
| 7,788,181 B2 | 8/2010 | Ben-Menahem et al. | |
| 7,788,730 B2 * | 8/2010 | Dean et al. | 726/30 |
| 8,051,299 B2 * | 11/2011 | Saunier | 713/187 |
| 8,341,422 B2 | 12/2012 | Kiehtreiber et al. | |
| 8,352,733 B2 | 1/2013 | Mantere et al. | |
| 8,375,458 B2 | 2/2013 | Kiehtreiber | |
| 2002/0077986 A1 * | 6/2002 | Kobata et al. | 705/52 |
| 2002/0099955 A1 * | 7/2002 | Peled et al. | 713/200 |
| 2002/0194484 A1 | 12/2002 | Bolosky et al. | |
| 2004/0025036 A1 | 2/2004 | Balard et al. | |
| 2006/0047958 A1 | 3/2006 | Morais | |

FOREIGN PATENT DOCUMENTS

| | | |
|---|---|---|
| WO | 02/41147 | 5/2002 |
| WO | WO 2005/029223 | 3/2005 |

OTHER PUBLICATIONS

Schneier, B., "Applied Cryptography, Second Edition: Protocols, Algorithms, and Source Code in C," Month Unknown, 1996, 7 pages, John Wiley & Sons, Inc.

* cited by examiner

SYSTEM AND METHOD FOR AUTHENTICATING CODE EXECUTING ON COMPUTER SYSTEM

CLAIM OF BENEFIT TO PRIOR APPLICATIONS

This application is a continuation application of U.S. patent application Ser. No. 11/620,599, filed Jan. 5, 2007, now published as U.S. Publication 2008/0168553, which is incorporated herein by reference.

FIELD OF THE DISCLOSURE

The subject matter of the present disclosure relates to a system and method for authenticating the identity of code executing on a computer system against various constraints.

COMPUTER PROGRAM LISTING

The following table shows 6 files that are provided as computer program listing filed electronically herewith as text files, which are hereby incorporated by reference in their entirety.

TABLE

Computer Program Listing Appendix

| # | File | Size | Type | Last Modified |
|---|---|---|---|---|
| 1 | cshosting | 3 KB | DEFS File | Jan. 5, 2007 |
| 2 | SecCodeHost | 10 KB | Header File | Jan. 5, 2007 |
| 3 | SecCode | 16 KB | Header File | Jan. 5, 2007 |
| 4 | SecRequirement | 8 KB | Header File | Jan. 5, 2007 |
| 5 | SecStaticCode | 5 KB | Header File | Jan. 5, 2007 |
| 6 | StaticCode | 25 KB | CPP File | Jan. 5, 2007 |

BACKGROUND OF THE DISCLOSURE

The identity and authenticity of programs stored and running on a computer system is a fundamental security issue for users. Essentially, users want the programs they interact with and that operate on their behalf to perform as the program is advertised. Users may encounter problems when they trust a specific program, but the program behaves in an unexpected way. In some situations, the program may have been deliberately altered, or a virus or other security issue may be present. More often than not, the program simply behaves differently than the user initially expected because it does not come from a trusted source, it has been altered at some point rendering it incompatible with other components, or it is ineffective for whatever reason.

Current operating systems do not have consistent mechanisms for establishing and authenticating identities of programs. In Mac OS X, for example, many components are capable of storing paths, which are used to identify programs. Such a stored path is useful for determining if the program has been relocated from where the stored path indicates. However, the stored path does not bind the identity of the program, does not allow the program to be legitimately relocated (e.g., on non-local disk media), and does not address any alteration of the program after it was produced by the manufacturer.

In another example, other components of Mac OS X use bundle identifiers or other fields in an Info.plist of a program and trust these identifiers to establish the identity of the program. As is known, an Info.plist is an Information Property List File that is required for Mac OS X software programs packaged in the form of a bundle. The Info.plist contains key-value pairs that specify information used at runtime by the operating system and the software program that contains the property list. However, any benefit of identifying and authenticating the program using the bundle identifiers in the Info.plist can be easily circumvented when the Info.plist is copied and edited.

In yet another example, components of Mac OS X may use a keychain layer to establish the identity of programs and to assign access privileges to resources based on the identity of programs that are visible to the user. As is known, a Keychain is an encrypted container that holds Keychain items, which can be passwords, keys, certificates, text strings, and the like. Keychains can be used to manage the multiple passwords, keys, certificates, etc. that are needed in a computer system to access programs or to use secure services.

Because Keychains are secure storage containers, access to their contents cannot be obtained unless the Keychain is unlocked by a password or key. Once unlocked, trusted programs are allowed to access the keychain items contained in the Keychain. To allow access to trusted programs, the Keychain includes an Access Control List (ACL) layer that allows access to Keychain items based directly on what program is calling the Keychain. The ACL layer specifies what operations can be done with Keychain items, such as decrypting or authenticating, and specifies what trusted programs can perform the specified operations without authorization from the user. Accordingly, these trusted programs usually only need to call a Keychain Service API to store or retrieve Keychain items in an unlocked Keychain.

The Keychain layer in Mac OS X allows programs to be relocated if necessary and provides some tamper protection for the programs. However, the benefits of the Keychain layer for identifying programs may be lost whenever the program is altered (e.g., by software updates or the like). For example, the Keychain layer uses a hash scheme to recognize a program as being trusted for access to the Keychain items. If the program has been changed by an update or the like, then hash values for the updated program will not be recognized because they will not match the values in the Keychain layer. By default, the Keychain Services API automatically dialogs the user in this situation. In the dialog, the user is asked to recognize the updated program as being essentially the same as or different from the program when it was formerly trusted. Thus, the user must explicitly allow the updated program to access the implicated Keychain from then on. If a user's system receives multiple updates to multiple programs, repeated dialogs to the user are needed to grant the newly updated programs access to various Keychains. Not only does this have implications when a user's system is legitimately updated or changed, but there are also security implications involved when programs on a user's system are illegitimately changed or new programs are added that have or request access to Keychains.

In addition to the issues above, all these mechanisms blindly trust on-disk (static) code. Consequently, any properly timed modifications to on-disk code can attack program files after checks have been made, circumventing any benefits of these mechanisms. Furthermore, a redirection attack can fool the operating system into believing the wrong program is actually running Finally, all these mechanisms rely on a very specific definition of what constitutes a "program" for identity purposes. Usually, a "program" is only an application bundle or only an executable file. Ancillary elements (e.g., AppleScripts, applets, widgets, etc.) may simply not register as a "program" with these mechanisms, or they may improperly register as a browser, a widget runner, an AppleScript interpreter, etc.

Consequently, a mechanism is needed for establishing and authenticating the identity of code in a number of forms while it is on disk and while it is running on a computer system. The subject matter of the present disclosure is directed to overcoming, or at least reducing the effects of, one or more of the problems set forth above.

SUMMARY OF THE DISCLOSURE

The subject matter of the present disclosure relates to a system and method for authenticating the identity of code executing on a computer system against various constraints. A code authentication architecture provides an infrastructure and rule set for assigning an identity to code and verifying the authenticity of that identity when the code is executing on a computer system. In the architecture, a vendor signs their code as being properly made by them using a digital signature. The types of code that can be signed can include any element that can be exploited, changed, or altered to make a system perform in ways unexpected to the user.

The architecture computes the validity of signed code identities, expresses constraints or requirements that the signed code must satisfy to be valid, includes Application Programming Interfaces to evaluate results and set parameters, and distributes responsibilities of validating signed among code having host/guest relationships. Once the code is signed, for example, the architecture can detect modifications that occur to the signed code caused by incidental or deliberate corruption while the code is stored and/or executing on a user's computer system. Detecting such modifications allows the executing code to be reliably and persistently identified. In another example, the architecture can allow a user's computer system to reliably determine that two pieces of signed code are meant to be treated the same, even though they may not be byte-for-byte identical. In particular, the code's manufacturer can express unambiguously using signed information in the code that a piece of new code is meant to be an update to older code. In this way, the user is not required to verify the identity of the new code when loaded on the user's computer system.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
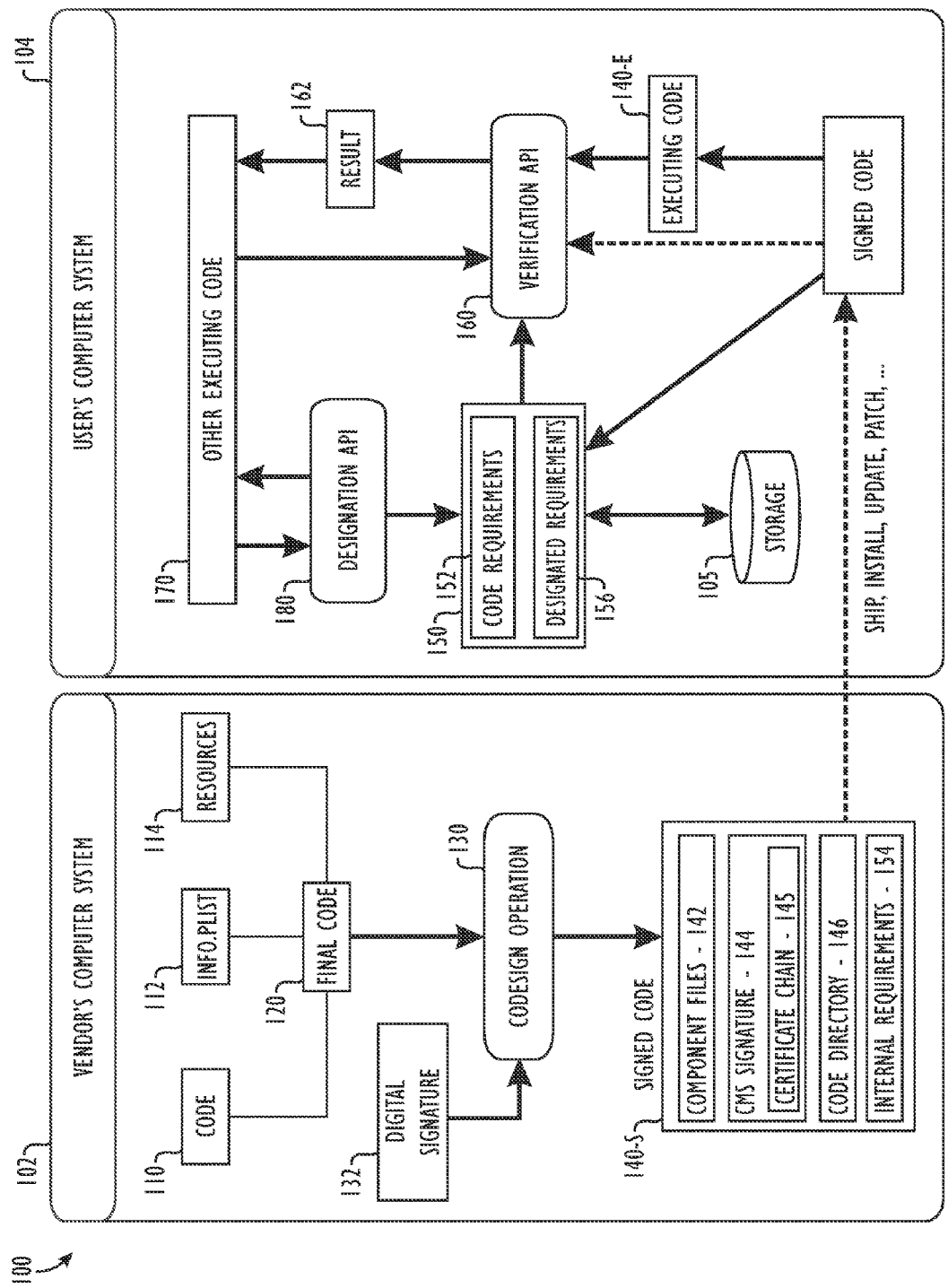
FIG. 1 illustrates one embodiment of a code authentication architecture according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

I. Architecture for Authenticating Code

Figure 2:
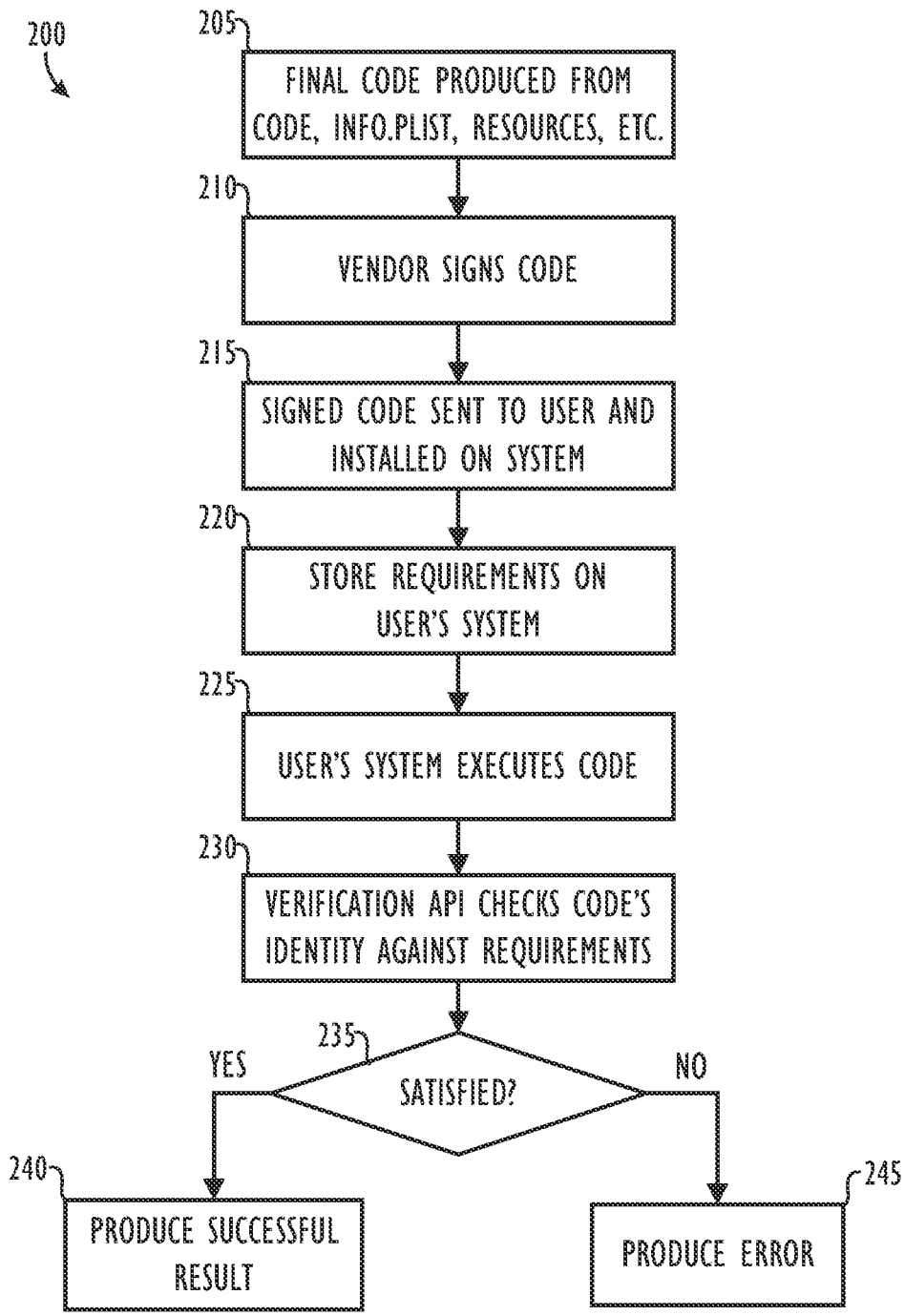
FIG. 2 illustrates one embodiment of the operation of the code authentication architecture of FIG. 1.

Turning to the drawings, one embodiment of a code authentication architecture 100 is shown in FIG. 1, and its operation 200 is shown in FIG. 2. As shown FIG. 1, a vendor's computer system 102 is shown in relative to a user's computer systems 104, which can be a personal computer, laptop, or other computing device. In general, the architecture 100 is used to identify "code" generated by the vendor and associate signing identity 132 having various pieces of encrypted information with that identified code at the vendor's computer system 102. "Code" in the present disclosure generally includes any software element that can be exploited, changed, or altered to make a computer system perform in ways unexpected to the user.

Once the signing identity 132 is associated with the identified code to produce signed code 140-S, the architecture 100 is used at runtime on the user's system 104 to verify the authenticity of that signed code 140's "identity" against various requirements or constraints imposed by the user's system 104 and/or other code running on the user's system 104. In this respect, authenticating the identity of the signed code 140-S involves two combined approaches that work together on the user's computer system 104. A first approach addresses the static integrity of the signed code 140-S on disk in the user's system 104. A second approach addresses the dynamic validity of code (executing code 140-E and other code) while executing in the user's system 104.

As explained in more detail below, the notion of "identity" for the signed code 140-S executing on the user's system 104 has typically two parts: (1) the authority of the vendor who signed the code (e.g., Apple signed this code) and (2) something that the authority said about the code (e.g., Apple said this is a mail application or Apple said this application has access to ".mac" password information). The signing identity 132 lock the code 140 and associated encrypted information against tampering so that the user's system 104 can determine if any changes were made to the code 140 after signing. In this way, the user's system 104 can determine whether a piece of code running on the system 104 has a valid identity. Based on that valid identity, the user's computer system 104 can then implicitly trust that the code 140 really implements (runs, executes) what it claims and has not been altered from when it was signed at the vendor's system 102. In addition, the user's computer system 104 can determine whether the code 140 satisfies other requirements or constraints.

Initially, the vendor, who can be any type of software manufacturer or developer, creates code 110, such as a main executable, and other related files 112 and 114 and bundles these together using known techniques to produce final code 120 of a software program, application, or the like for users (See Block 205). If the final code 120 is intended to run on a Mac OS X operating system, the other related files can include an Info.plist file 112 and resource files 114 (e.g., libraries, nib files, images, etc.), which are packaged together in a "bundle" with the main executable code 110. For purposes of the present disclosure, the final code 120 may be any software elements that can be identified as "code" and can include, but is not limited to, a process, object code, single executable file, bundle, nib resource file, interpreted script, Applet, widget, library, plug-in, and any "code-like" data format.

The vendor then signs the final code 120 to produce signed code 140-S (See Block 210). This signing step adds data structures that bind the main executable code 110 and optionally additional files (e.g., Info.plist file 112 and resource files 114) with a signing identity 132 associated with the vendor as signer. This data then becomes part of the signed code 140-S's bundle and is delivered and copied along with it. Signing of the final code 120 to produce the signed code 140-S preferably occurs after all of the editing has been completed, all of the resources are properly set, and the software program is ready to ship to users.

In its basic form, signing the code involves indicating that certain portions of the final code 120 will uniquely identify the code 140 being signed and associating a signing identity 132 to that identifying code. In this way, the signing identity 132 indirectly secures the signed code 140-S from being modified or altered by ensuring that the identified code remains intact from the point when the vendor signed the code 140 and has not been modified thereafter. Taken together, the identifying code and the signing identity 132 securing it constitute an "identity claim" of the signed code 140-S. This identity claim gives the user's computer system 104 a way to validate the signed code 140-S and ensure that someone other than the vendor did not fake the identity claim itself or alter the signed code 140-S of the program in some way.

In the code signing, for example, the vendor can use a code signing operation (e.g., codesign command) in a program building application 130, which can be a development tool for creating programs for Apple's Mac OS X, for example. In the code signing operation, the vendor can package component files 142, a digital signature 144, and a code directory 146 on disk. In general, some elements of the code suitable for being signed include the directory, the object code, Info.plist file, nib files, other resource files, and other code or code-like components that are at least helpful in securing the identity of a program or ensuring its integrity. In one embodiment, the digital signature 144 is embodied in a Cryptographic Message Syntax (CMS) data structure that secures the code directory 146 against modification and contains the vendor's chosen certificate chain 145. In turn, the code directory 146 contains a unique identifier (not shown) chosen by the vendor (for example, "com.apple.Mail"), cryptographic hashes (not shown) of the various component files 142, and various other information useful for verification, such as a list (not shown) of internal requirements 154 (discussed later).

Once signed, the signed code 140-S can be moved, copied, packaged, compressed, or the like without destroying the signing identity 132 associated with it as long as the code 140 remains the same as it was when signed. In addition, the signed code 140-S can be transferred to the user by shipping, installing, downloading, patching, or any other known method and can be ultimately stored on the user's system 104 as long as the signed code 140-S eventually installed on disk at the user's system 104 is the same as it was on the vendor's system 102 after being signed (See Block 215). With the signed code 140-S installed and the requirements 150 stored on the user's system 104, the CMS signature 144 secures the integrity of the code directory 146 against modification, which in turn protects the integrity of the component files 142, internal requirements 154, and other parts of the signed code 140-S.

One or more requirements 150 are also stored in storage 105 on the user's computer system 104 (See Block 220). As will be explained later, some of these requirements 150 (e.g., internal and designated requirements) can be retrieved from the signed code 140-S itself. Other requirements 150 can be obtained independently of the signed code 140-S and depend on constraints of the user's system 104, such as constraints from other executing code running on the user's system 104.

Eventually, the signed code 140-S may be run on the user's system 104 (See Block 225). While run as executing code 140-E, various calls can be made to a verification API 160 to authenticate the identity claim of the executing code 140-E and validate that identity against various requirements 150 (See Block 230). What various API calls are made and what requirements 150 are imposed may depend on what other executing code 170 has loaded the signed code 140-S, what other executing code 170 utilizes the executing code 140-E, etc. For example, other executing code 170 on the user's system 104 may typically make a call to the verification API 160 when it is loading the signed code 140-S and wants to impose one or more requirements 150 on the signed code 140-S it is loading.

When called, the verification API 160 determines whether the digital signature(s) and other encrypted information in the signed code 140-S satisfies the requirements 150 being imposed (See Decision 235). If they do, then the API 160 produces a successful result 162 for some purpose associated with the other executing code 170 on the user's system 104 (Block 240). In the requirements 150 are not satisfied, an error is produced for the result 162, and the other executing code 170 enforces the error according to its design (Block 245).

In the present embodiment, the code authentication architecture 100 lacks mechanism for enforcing results 162 and lacks mechanisms for denying or allowing access to information or services. Instead, these mechanisms are the province of the callers of the validation API 160 to implement based on the API 160's results. In other embodiments, however, the architecture 100 can include these types of mechanisms.

There are various situations where the executing code 140-E will fail to satisfy requirements 150 resulting in an error. In one situation, the identity claim of the executing code 140-D may be invalid because the signed code 140-S has been altered in some way from when it was signed by the vendor. In one example, an identified resource in the signed code 140-S may have been changed. Thus, the altered resource will not have the same hash values as those hash values for the identified resource contained in the information secured by the CMS signature 144 of the signed code 140-S. Because the hash values do not match, the identity of the signed code 140-S is invalid.

In another situation, the identity of the signed code 140-S may be valid, but that valid identity simply does not meet the requirements 150 imposed. For example, the signed code 140-S may validly indicate it was signed by "Signing Authority A," but the other executing code 170 loading the signed code 140-S may have a requirement 150 that the code that it loads be signed by "Signing Authority B" instead.

Because a valid identity of the signed code 140-S requires that it not be altered after it has been signed, the signed code 140-S to be used for authentication purposes must be immutable and cannot be changed while it is on disk (static) in the user's system 104 from the state in which it was originally signed by the vendor. If the signed code 140-S is self-modifying or stores anything mutable within its bundle, the signed code 140-S will lose its identity when modified. Therefore, the signed code 140-S should not include modifiable components, such as preferences, icons, editable configuration files, and the like that can be and often are modified. Instead, these types of modifiable elements are preferably maintained separate from the signed code 140-S and could be contained in libraries or the like.

In addition, any scheme that rewrites (as opposed to merely copying) the signed code 140-S on disk in the user's system 104 will cause the signed code 140-S to lose its identity. If a re-writing scheme must be used with respect to the signed code 140-S, a cache can be established for the rewritten code instead of rewriting the original signed code 140-S on disk. The integrity of this cache can be locally secured by the user's system 104. When needed, an appropriate link can be provided between the original and rewritten copy of the signed code 140-S for verification purposes.

II. Verification API

With an understanding of the code signing architecture 100, we now turn to a brief discussion of the verification API 160. Preferably, the verification API 160 is based on Apple's Core Foundation and is part of Security.framework. The verification API 160 consists of multiple header files that include "SecCode," "SecStaticCode," and "SecRequirement" for the verification API 160, which are incorporated in the computer program listing.

The verification API 160 uses three API object types, including SecCodeRef, SecStaticCodeRef, and SecRequirementRef. SecCodeRef identifies the running code to be verified, and SecRequirementRef identifies the requirement to be applied to this code. Another type, SecStaticCodeRef, identifies code on disk, such as bundles, tools, and scripts. Example script of the verification API 160 may be:

```
SecRequirementRef requirement;
SecCodeRef code;
OSStatus rc;
rc = SecRequirementCreateFromData(<data>, 0, &requirement);
rc = SecCodeCreateWithPID(<pid>, 0, &code);
rc = SecCodeCheckValidity(code, 0, requirement);
```

In this example, SecRequirementCreateFromData obtains a binary (blob) of the requirement stored in the user's system 104 and makes the requirement into the SecRequirementRef API object. SecCodeCreateWithPID obtains the code identifier for the process associated with an entered Process ID (PID), and SecCodeCheckValidity does the verification by checking the validity of the code's claimed identity and determines whether the code satisfies the requirements. Verification succeeds if all (rc==noErr).

III. Requirements in the Code Signing Architecture

As discussed previously, requirements 150 are used by the verification API 160 to validate the executing code 140-E. Architecturally, the requirements 150 can be script written in a small, dedicated language and can contain formulas describing conditions (restrictions or constraints) that the signed code 140-S must satisfy to be acceptable for some purpose. Preferably, the requirements 150 have an extensible nature and can act as a programming language being interpreted during code authentication. The requirements 150 can be stored in binary (blob) form in storage 105 of the user's system 104, such as in a configuration file, and they can be converted into an API type when needed by the verification API 160.

Several types of requirements 150 can be used—some of which are discussed below. The requirements 150 can contain a constraint on the certificate chain 145 of the digital signature 144 by placing a constraint on the signing anchor of the certificate chain 145. This is essentially a constraint on the authority that signed the code. A typical example of such a requirement 150 would be that the signing anchor be Apple's signing anchor indicating that the code was "signed by Apple." In this case, the requirement 150 would be satisfied if the signing anchor associated with the certificate chain 145 of the signed code's digital signature 144 has a hash value that matches a hash value for a specific signing authority in the requirement 150.

The requirements 150 can also be directed to an identifier embedded in the signature data. One example of such a requirement 150 would be that an embedded identifier matches "com.apple.Mail." Other requirements 150 can be directed to the contents of the signed code 140-S, the Info.plist, or something else that must match a constraint on the contents as specified in the requirement 150. Still other requirements 150 can be directed to application groups, such as a constraint that the signed code 140-S is a member of the "dot-mac" application group. These constraints (anchor, identifier, Info.plist content, and application group) and other constraints can be combined together using one or more logical operators to make additional requirements 150.

Based on the concepts above, requirements 150 can be classified into external (code) requirements stored separately on the User's Computer System 104, internal requirements 154, and designated requirements 156. Each of these will be discussed below.

A. Code Requirements

Code requirements 152 are imposed externally on the executing code 140-E and are used to validate the identity of the executing code 140-E as being what it claims (i.e., as coming from the vendor unchanged from when it was signed). Typically, other executing code 170 on the user's system 104 calls the verification API 160 and imposes a code requirement 152 on executing code 140-E. If the underlying code has been altered from when it was originally signed or the code's signing authority does not match that contained in the code requirement 152, then the verification API 160 determines that the code's identity fails to meet the code requirement 152 and produces an error result 162 that the other executing code 170 will then enforce according to its design.

In one example, other code 170 executing on the user's system 104 may want to determine whether the subject code 140-E that it is loading is actually an authentic mail application (e.g., Apple's Mail.app). In this situation, the executing code 140-E will need to meet code requirements 152 that it was actually signed by Apple and that the Info.plist bundle identifier is com.apple.Mail. In another example, the executing code 140-E might need to meet code requirements 152 that it was signed by Apple with a particular release certificate and thereby known to be part of an official software release signed by the Apple. If the verification API 160 determines that the executing code 140-E does not meet these code requirements 152, then the other executing code 170 may kill the executing code 140-E or not allow it to perform some operation or have access to information.

An independent party would not be able to independently sign code or alter existing signed code 140-S to meet these code requirements 152 without actually having the signing key for Apple to reproduce Apple's digital signature 144. In the architecture 100, a third party must independently sign code that it modifies or creates so that the third party cannot make a "custom identity" incorporating another signer's digital signature. Therefore, the claimed authority of the third party would derive from their signing identity and would be entirely separate from any original code signature given by the original signing vendor.

The code requirements 152 are constraints on the state of the signed code 140-S and its bundle. Therefore, the code requirements 152 depend on constraints associated with the user's computer system 104 used to verify the "identity claim" contained the signed code 140-S, and they do not depend on constraints from the vendor who signed the code. Different user computer systems 104 may have different code requirements 152 for the same signed code 140-S when executed such that some user computer systems 104 may find their code requirements 152 satisfied while others do not, even though the various user computer systems 104 access the same underlying code 140 with the same "identity claim."

B. Internal Requirements

The code authentication architecture 100 can validate some of the executing code 140-E's identity against a code requirements 150 so that the user's computer system 104 can be assured that the part of the code secured by the signature is intact and trustworthy for the system 104's purposes. However, other supporting code (e.g., libraries, plug-ins, etc.) may not necessarily be signed. This other supporting code is often used by the primary signed code and may affect the integrity of the primary signed code. For this, the host computer system 104 may simply trust the primary signed code 140-S to maintain its integrity for identity purposes when executing. Put simply, by trusting the identity of some signed code 140-S, the user's system 104 may implicitly trust that the vendor of that signed code 140-S has taken proper measures to maintain the integrity of the code 140 throughout its execution. For example, the user's system 104 may trust that the executing code 140-E will not to blindly load plug-ins without knowing what they are or what they do. Using the verification API 160 to validate the code requirements 150 against the claimed identity 142 of executing code 140-E does not determine how trustworthy the actual raw code itself is. Instead, the verification by the API 160 expresses trust in the signer (vendor) of the signed code 140-S, as long as the identity of that code is validated and the user's constraints are met with respect to the source of the code.

Using another type of requirement 150, however, trust can be explicitly extended to other code. This type of requirement is an internal requirement 154, mentioned only briefly in the code signing operation. The vendor embeds these internal requirements 154 into the signed code 140-S when signing the code 140-S so that the internal requirements 154 are directly secured by the vendor's digital signature 144 and a hash in the code's directory 144. Once on the user's system 104, the internal requirements 154 are retrieved from the signed code 140-S on disk. When running the executing code 140-E, these internal requirements 154 are used to verify the claims of other code that the executing code 140-E wishes to use or to verify the claims of other executing code wishing to use the executing code 140-E if its signed code 140-S contains internal requirements 154.

The internal requirements 154 can be distinguished by what other code (outside the code in which they are embedded) that they want to constrain. Some examples of possible internal requirements 154 are provided below. However, the set of internal requirements 154 is extensible. A Host Requirement constrains the "host" code that is allowed to run (supervise, control) the subject code with the embedded host requirement. A Guest requirement constrains what "guests" other code that a subject code is allowed to run (safely). A Library requirement constrains dynamic libraries with which the subject code may be linked. A Plug-in requirement constrains code plug-ins that the subject code is allowed to load.

For example, if the signed code 140-S is a RUBY interpreter, then an internal requirement 154 in the signed code 140-S may specify that its "guest" (any executing code for which it is responsible for loading and managing) must be a Ruby script signed by Apple. Likewise, if the signed code 140-S is a RUBY script, then an internal requirement 154 in the signed code 140-S may specify that its "host" (any executing code responsible for loading and managing the signed code) must be a Ruby interpreter signed by Apple. Some examples of supporting code that may be designed to meet internal requirements 154 include libraries, plug-ins, interpreting scripts, etc. Preferably, resources are directly identified through the code directory 146 and are not constrained by internal requirements 154.

C. Designated Requirements

Another type of requirement is a designated requirement 156 used designate an identity of subject code for various purposes. In a typical situation, an application may select a code bundle or file to perform a particular operation on the user' system 104, but the application often has no pre-conceived notion of what code should be trusted. For example, the user may be implementing parental controls on the user's system 104 and may be using a parental controls application to browse through application folders and select various application files for permission privileges. In this situation, a designated requirement 156 is produced that can be used later by the verification API 160 to re-identify the executing code 140-E associated with those files selected by the user with the parental controls application. In this way, any current identity of those files (their current location on disk, Info.plist contents, etc.) can be compared to the designated requirement generated when they were originally selected.

To produce a designated requirement 156, the code authentication architecture 100 includes a Designation API 180 operating on the user's system 104 that responds to API calls from executing code 170. (The Designation API 180 may be part of the verification API 160 or separate). The Designation API 180 receives the call and returns a designated requirement 156 for the subject code implicated in the call. When called, the Designation API 180 produces an API requirement object that is suitable for uniquely identifying the code 140-S. In one embodiment, the Designation API 180 can build the code identifier heuristically based on what is contained in the subject code's data (signature path, Info.plist contents, hash of code directory, etc.).

In our previous example, the user selects a file, and the parental control application calls the Designation API 180, which returns a designated requirement 156 for that selected file. The designated requirement 156 in this case may be a code identifier heuristically built from what is currently contained in the file's data (signature path, Info.plist contents, etc.). Later, other executing code 170 (e.g., a web browser) may wish to verify the validity of the file by calling the verification API 160. Using the designated requirement 156 for the file, the verification API can determine whether the current file subject to the call is still the same as the file when it was originally selected by examining the file's data at this later time against the previously produced code identifier.

In the previous embodiment, the designated requirement 156 is generated by an API call and synthesized as needed. In another embodiment, a designated requirement 156 such as a code identifier can be directly embedded in signed code as an internal requirement 154 and secured by the digital signature of the vendor as opposed to being heuristically built. In this way, the signer can override the normal automatic generation of a designated requirement 156 by adding an internal requirement 154 that is a type "designated requirement" to the signed code 140-S. The Designation API 180 will retrieve it when asked for one. Therefore, this type of designated requirement 156 is "internal" when classified by storage mode, though it is really an "explicit designated requirement." In one example, the vendor may find it useful to allow a group of programs to have the same designated identity. In this case, the vendor can directly embed the code identifier as a designated requirement 156 in the subject code of the group of programs and secure it by digital signatures.

IV. Host/Guest Validation Service for Executing Code

In the previous discussions, other executing code 170 on the user's system 104 has been described as calling the verification API 160 to verify that the executing code 140-E satisfies various requirements 150. The other executing code 170 may be responsible for loading and managing the execution of the signed code 140-S. In this case, the other executing code 170 may be considered a "host" of the executing code 140-E, which in turn is considered a "guest."

Conceptually, all executing code on the user's system 104 can be part of a hierarchy of executing code having host and guest relationships. In these relationships, executing code may be a "host" responsible for running, managing, and controlling its "guest" and protecting itself against intrusion and subversion by its "guest." Likewise, the same executing code may itself be a "guest" supervised by another "host." Thus, in the user's system 104, various host/guest relationships may develop between executing code so that all of the executing code can be organized into a hierarchical tree of hosts and guests with the operating system kernel at the root.

Figure 3:
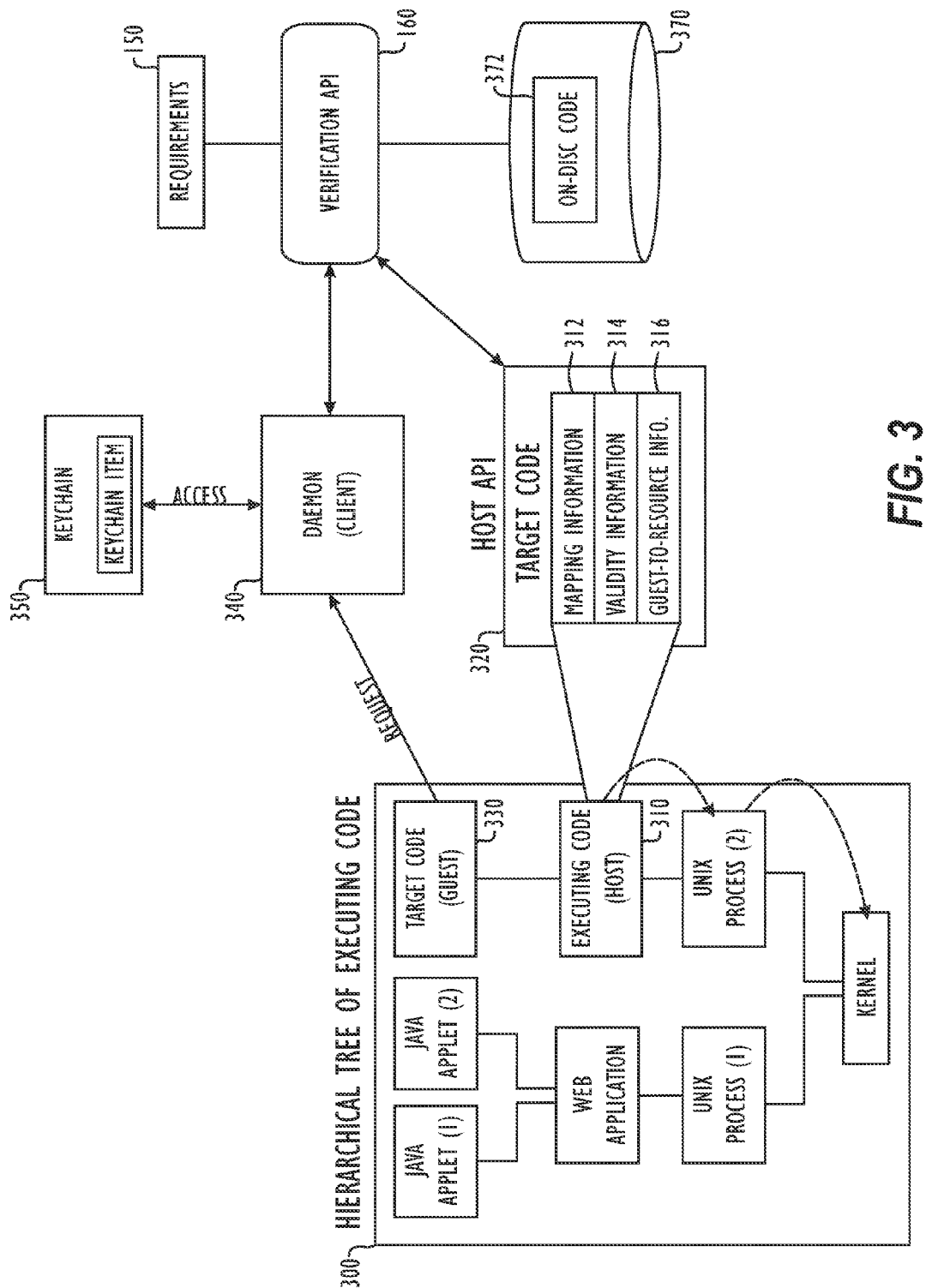
FIG. 3 illustrates one embodiment of additional features of the code authentication architecture of FIG. 1 relative to a hierarchical representation of executing code on a user's computer system.

FIG. 3 shows just such an example of a hierarchical tree 300 of host/guest relationships that may exist among the executing code on the user's system 104. This example is only meant to be illustrative, and it is understood that the tree 300 may be more complex. In addition, the tree 300 may "exist" on the user's system 104 by virtue of the various relationships between the executing code and is not necessarily stored as a distinct data structure, although it could be stored as a data structure of API objects.

In this example tree 300, the kernel, which may be implicitly trusted, is at the root and acts as host to two UNIX processes. The first UNIX process has a web application (e.g., Safari) as guest, which in turn has two Java Applets as guests. The second UNIX process has an executing code 310 as its guest, and that executing code 310 in turn acts as host to another executing code 330, which will be referred here sometime as target code.

Because each executing code is a guest such that it is run by another executing code acting as host, a chain of hosts (or hosting chain) is formed in the tree 300. By default, executing code in the user's system 104 is identified as belonging to (and being part of) its host. Thus, each host defines and organizes the distinction between its guests and itself. For example, the kernel is in charge of separating and identifying different processes (e.g., the UNIX processes). The web application is in charge of identifying its applets (e.g., the Java Applets) and answering calls, such as "Which of your Applets tried to open this file?" Thus, the web application could then answer "this Applet," creating in the process a separate code identity for it, or it could answer "myself."

In the embodiment of FIG. 3, hosts (e.g., executing code 310) and guests (e.g., target code 330) share the work of ensuring the validity of executing code in the user's system 104. For example, a host 310 ensures that the link to information in signed code 372 on disk 370 for its guest 330 is maintained and that the main executable (whatever it is) for the guest 330 is really what is executing. A guest 330 on the other hand controls what additional executing code it utilizes or incorporates, and the guest 330 asks its host 310 to mark its identity as invalid if it utilizes executing code that violates the guest 330's own internal requirements.

To achieve this division of work, each host 310 manages and stores dynamic information about each of its guests 330. The managed information includes mapping information 312, validity information 314, and guest-to-resource information 316. For the mapping information 312, each host 310 maps for each of its guests 330 the location of on-disk (static) code (e.g., files 372 on disk 370) from which the guest 330 was launched under control of the host 310. The host 310 then stores this as one or more links in its mapping information 312 for the guest 330. In this way, the mapping information 312 links the executing code of the guest 330 to the location of the signed, on-disk code 372, including its digital signatures, signed directory, code identifiers, etc., for that executing code.

For the validity information 314, each host 310 maintains a flag for each of its guests 330 that indicates whether the identity of the guest 330 is valid. During the supervised loading of its guest 330, the host 310 verifies that the signed information in the on-disk code 372 satisfies specified requirements 150 as it loads, and the host 310 sets the flag in the validity information 314 for the guest 330 accordingly. In this verification when the main executable of the on-disk code 372 is loaded under the supervision of the host 310, the host 310 uses the verification API 160 and requirements 150 discussed previously.

When the host 310 loads the guest 330, it incrementally validates portions (pages) of the guest 330's code as the code is brought into memory and latches the flag if validation fails. Once latched as invalid, the flag is not reset. If validation is successful at loading, subsequent activity during execution may alter the guest 330, and logic for checking the validity of the guest 330 can "latch" this flag to indicate the validity as invalid. The flag may be latched as invalid if the guest 330 fails to have a valid identity for whatever reason, such as violating its own internal requirements. Alternatively, the flag may be latched if a link provided in the mapping information 312 to the location of the on-disk code 372 becomes invalid, such as when the on-disk code 372 has been moved or an improper replacement for the on-disk code 372 has been utilized.

For the guest-to-resource information 316, each host 310 identifies which of its guests 330 is associated with a particular resource in the host's context and stores this association as part of the guest-to-resource information 316. For example, the host 310 will store whether the guest 330 is associated with a given Process ID (PID), port, parent process ID, process group ID, Saved User ID, terminal window from which the process was launched, or other distinguishing resource. This guest-to-resource information 316 can then be used to locate a host 310 for a given guest 330.

At some point during execution, the guest (target code) 330 may call some other executing code 340 (referred to here as a "client") to request some operation or to gain access to information. In this situation, the client 340 may need to verify the identity of target code 330. For example, the client 340 may be a background server process ("daemon") providing access to a keychain 350 via a Keychain Service API (not shown), and the target code 330 may be requesting access to the keychain 350 to obtain one of the keychain items (e.g., a ".mac" password). In this situation, the client 340 needs to determine whether the target code 330 should be granted access to the keychain 350.

To determine whether to allow access, the client 340 calls the verification API 160. Although authenticating the target code 330's identity will be performed according to the techniques discussed previously (See FIG. 1), host/guest validation services are performed behind the scenes using a Host API 320 and the previously described managed information 312, 314, 316 of the hosts 310.

In these host/guest validation services, the target code 330 is validated by recursively validating the target code 330 and the various hosts in the hosting chain associated with the target code 330. In the recursive validation, the Host API 320 determine the validity of the target code 330, its host (executing code) 310, that host 310's host (e.g., second UNIX process), and so on though the hosting chain until the kernel or some designated root code is reached in the tree 400. The Host API 320 does this by validating internal requirements 154 of the executing codes in the hosting chain, which is formed only when needed based on the dynamic information maintained by hosts through the Host API 320.

If each of the validations in the hosting chain is successful, then verification of the target code 330's identity against external requirements 150 will be performed according to the techniques discussed previously by a separate call from the client 340 to the verification API 160. The Host API 320 and the complexity of its validation logic are preferably hidden from callers of the verification API 160. Therefore, the client 340 calling the verification API 160 only deals with obtaining a code identity and matching it against requirements 150 using the validation API 160.

The header file for the Host API 320 is SecCodeHost.h incorporated in the computer program listing. The Host API 320 is called by code hosts (except for the kernel that has a different interface fashioned through system calls). Also used is a code hosting InterPorcess Communication (IPC) interface that is called (answered) by hosts to respond to queries about their guests. A Mach Interface Generator (MIG) file for the code hosting IPC interface is the "cshosting" file incorporated in the computer program listing.

The source files responsible for validating various parts of the on-disk (static) data structures of subject code are provided in the "StaticCode" file incorporated in the computer program listing. Furthermore, a brief excerpt of code for implementing dynamic validation in the hosting chain is provided below:

```
void SecCode::checkValidity(SecCSFlags flags)
{
  if (this->isRoot( ))
  {
    // The root-of-trust (e.g., Kernel) is valid by definition.
    return;
  }
  // Check subject code's host first, recursively.
  this->host( )->checkValidity(flags);
  // Check subject code's own dynamic state next because there would be
  // no point performing static validation of the subject code if the
  // dynamic state is invalid.
  if (!(this->host( )->getGuestStatus(this) & CS_VALID))
    MacOSError::throwMe(errSecCSGuestInvalid);
  SecStaticCode *myDisk = this->staticCode( );
  SecStaticCode *hostDisk = this->host( )->staticCode( );
  // Check subject code's static state.
  myDisk->validateDirectory( );
  myDisk->validateRequirements(kSecHostRequirementType, hostDisk);
  // Check the guest requirements of the subject code's host
  if (!this->host( )->isRoot( ))
    hostDisk->validateRequirements(kSecGuestRequirementType,
      myDisk);
}
```

Figure 4:
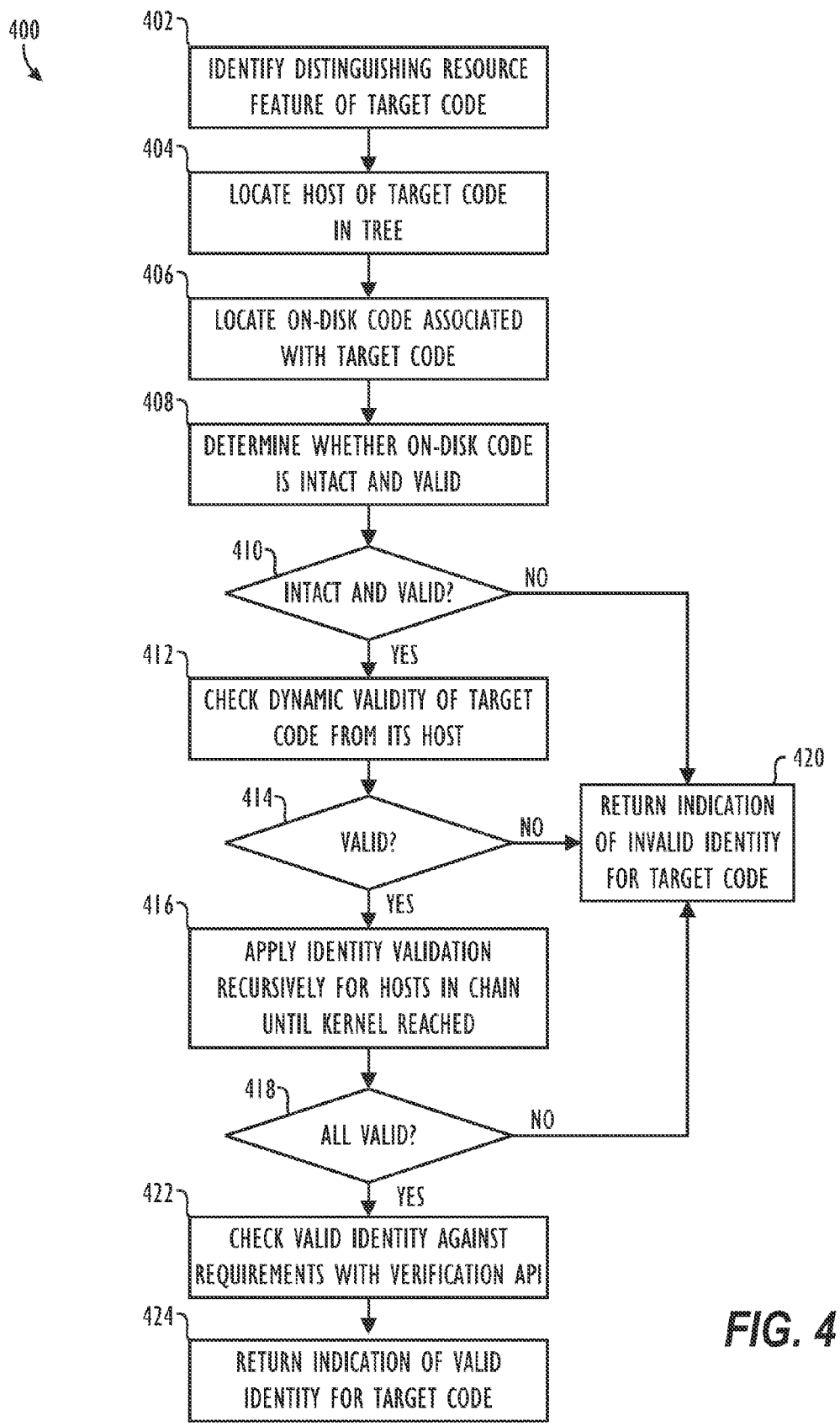
FIG. 4 illustrates one embodiment of host/guest validation services in flow chart form.

FIG. 4 illustrates one embodiment of host/guest validation services 400 in flowchart form. When called by the client 340, the verification API 160 determines a distinguishing resource feature of the target code 330, such as its associated Process ID, port, etc., and passes this information on to the Host API 320 (See Block 402). Then, using this distinguishing resource feature of the target code 330, the Host API 320 locates the host 310 for the target code 330 based on the guest-to-resource information 316 maintained by the hosts 310 (See Block 404). Once located, the Host API 320 uses the one or more links in the mapping information 312 to locate the on-disk code 372 that the host 310 used to load the executing target code 330 (See Block 406).

With the on-disk code 372 located, the Host API 320 performs computations to determine if the on-disk code 372 is intact and valid in the context of the host 310 (See Block 408 and Decision 410). In determining the validity of the on-disk code 372, for example, the Host API 320 can verify the cryptographic signature of the on-disk code 372 and can verify that all the signed component files, resources, etc. are intact. This can be done using internal logic of the Host API 320 for checking validity and/or using calls to the verification API 160.

In addition, the Host API 320 can compare information in the on-disk code 372 against information in the target code's host 310 and against any constraints between the host 310 and the target code 330. For example, the Host API 320 can examine any internal requirements 154 in the on-disk code 372. As discussed previously, such internal requirements 154 and other qualifying and classifying information for host/guest relationships can be embedded into the signed, on-disk code 372 (e.g., placed into the Info.plist of the signed code) and can include constraints on what form of executing code can be a host for the signed code 372 and what form of executing code (if any) can be the signed code 372's guest.

If the computations succeed, the Host API 320 then checks the status of the dynamic flag in the validity information 314 for the target code 330 maintained by the host 310 to determine if the executing target code 310 is still identified and valid for the host 310 (See Block 412 and Decision 414). If the flag indicates that the executing target code 330 is still identified and valid for the host 310, then the target code 330 has a valid identity as to its host 310.

If the executing target code 330 has a valid identity as to its immediate host 310, then the host/guest validation services are applied recursively through the hosting chain until the kernel or some designated root code is reached (See Block 416). For each of these recursive validations, the services determine whether the on-disk code of the immediate host's guest are intact and whether the validity flag indicates that the immediate host considers the identity of its executing guest to be identified and valid. The kernel or other designated root code may be implicitly trusted when it is reached. If all validity checks are satisfied (See Decision 418), a valid identity has been established for the target code 330, and an indication is returned that the target code 330 has a valid identity (See Block 422).

At various points in the service 400, validation may fail. For example, the computations may indicate that the on-disk code 372 for the target code 330 is not valid or intact or a flag may be latched as invalid. In the event of a validation failure, an indication is returned that the target code 330 has an invalid identity (See Block 420). Ultimately, the client 340 may deny the target code 330 access to the keychain 350 if the verification fails.

If the recursive validation has completed without any error results through the hosting chain, then a check is made to determine whether the valid identity of the target code 330 is acceptable to the client 340. Here, the verification API 160 discussed previously checks the valid identity of the target code 330 against any associated requirements 150. As before, the requirements 150 can be as simple or complex as needed, and they are applied to the on-disk code 372 for the executing target code 330 using the verification API 160. As in previous examples, the code requirements 150 may specify that the target code 330 must be "signed by Apple" and that the CFBundleIdentifier must be "com.apple.mail", which translates to indicating that the target code 330 "is Apple's genuine Mail program, any version."

If the target code 330 satisfies the requirements 150 and is acceptable to the client 340, the verification API 160 produces a favorable result (Block 424). Ultimately, the client 340 may allow the target code 330 to access the keychain 350 to obtain the keychain item 350, which might be a user's ".mac" password, for example. Although the above example has described gaining access to keychain 350, it will be appreciated that the host/guest validation services, Host API 320, and verification API 160 of the present disclosure can be applied to numerous other situations on the user's computer system 104.

In FIGS. 3 and 4, one client of the verification API 160 has been shown to be the keychain layer on the user system 104. It will be appreciated that the keychain layer is but one example of a client that can use the verification API 160 and that the verification API 160 and other features of the disclosed architecture 100 are not limited to being used for just the purpose of accessing Keychains. In general, any entity on the user system 104 can use the verification API 160 for various purposes.

As alluded above, "code" as defined herein for the purposes of code signing and authentication is meant to have a broad meaning beyond obvious executable code. As used herein and in addition to executables, "code" includes any element of software that can make a system perform arbitrary operations within its scope and is not limited to one particular well-constrained data set. In addition, "code" as used herein includes virtual code (such as Java binary code), scripts (such as Perl scripts), and startup scripts (UNIX-style .*rc files).

It will be appreciated that various low-level utilities are required to implement the code authentication disclosed herein. Preferably, two types of user-space drivers (for code file formats and code types) with multiple implementations are also used to implement the code authentication disclosed herein. The code format drivers provide extensible expression for file formats of on-disk code, and the code type drivers provide extensible expression of the behavior associated with different types of running code.

The foregoing description of preferred and other embodiments is not intended to limit or restrict the scope or applicability of the inventive concepts conceived of by the applicants. In exchange for disclosing the inventive concepts contained herein, the applicants desire all patent rights afforded by the appended claims. Therefore, it is intended that the appended claims include all modifications and alterations to the full extent that they come within the scope of the following claims or the equivalents thereof.

What is claimed is:

1. A method of performing code authentication of code executing on an electronic device, the method comprising:
   identifying a first requirement, stored in secured information in a first code, that constrains a second code executing on the electronic device to code provided by a particular authority and authorized, by the particular authority, to perform a particular action, wherein the first code is responsible for hosting the execution of the second code;
   identifying a second requirement, stored in secured information in the second code, that constrains a third code for which the second code is allowed to manage execution;
   obtaining identity information for the second code that identifies an authority of the second code and an action authorized, by the authority of the second code, to be performed by accessing the secured information in the second code on the electronic device;
   determining (i) whether the second code satisfies the first requirement based on a comparison between the identity information and the first requirement and (ii) whether the third code satisfies the second requirement; and
   providing a result of the determinations to the first code.

2. The method of claim 1, wherein the first code is responsible for managing the execution of the second code.

3. The method of claim 1, wherein the secured information in the second code comprises at least one of a constraint on subject code allowed to host execution of the second code, a constraint on subject code for which the second code is allowed to host execution, a constraint on a dynamic library with which the second code is allowed to be linked, and a constraint on a plugin that the second code is allowed to load.

4. The method of claim 1, wherein the second code comprises a unique identifier, wherein the first requirement designates how the second code is to be identified.

5. The method of claim 4, wherein the unique identifier is built heuristically based on data within the second code.

6. The method of claim 5, where the unique identifier is directly embedded in the second code and secured by a digital signature.

7. The method of claim 1, wherein the first code is executing on the electronic device.

8. The method of claim 1 further comprising verifying managed information associated with the second code and maintained by the first code, wherein the first code is executing on the electronic device.

9. The method of claim 8, wherein the managed information comprises a link to one or more components in the second code that are stored on disk and that were used by the first code to load the second code for execution.

10. A code authentication method comprising:
   receiving a call from a first code to verify target code executing on an electronic device;
   in response to receiving the call from the first code, performing a recursive first code authentication comprising:
      for each particular code in a chain of executing code associated with the target code, recursively verifying whether a dynamic state of the particular code satisfies a particular set of requirements based on managed information maintained by a respective particular host code in the chain of executing code that hosts the execution of the particular code, wherein the recursively verifying terminates upon reaching a designated root code hosting the chain of executing code; and
      verifying whether a dynamic state of the executing target code satisfies a first set of requirements stored in (1) a particular host code responsible for hosting the execution of the target code and (2) the executing target code, by verifying managed information maintained by the particular host code;
   in response to the dynamic state of the executing target code and each particular code in the chain of executing code associated with the executing target code being recursively verified, performing a second code authentication comprising verifying whether identity information, that identifies an authority of the target code and an action, authorized by the authority of the target code, to be performed, satisfies a second set of requirements stored in secured information in the first code, wherein the second set of requirements comprises a requirement that constrains the executing target code to code provided by a particular authority and authorized, by the particular authority, to perform a particular action; and providing a result to the first code based on the recursive first code authentication and the second code authentication.

11. The method of claim 10, wherein verifying whether the dynamic state of the executing target code satisfies the first set of requirements comprises determining whether a link to one or more components of the executing target code stored in the electronic device is valid.

12. The method of claim 10, wherein the designated root code is a kernel of the electronic device.

13. The method of claim 10, wherein verifying whether the identity information satisfies the second set of requirements stored in secured information in the first code comprises:
obtaining the identity information for the executing target code by accessing secured information contained in the target code stored on the electronic device; and
determining whether the obtained identity information satisfies the second set of requirements stored in secured information in the first code.

14. The method of claim 10, wherein verifying whether the dynamic state of the executing target code satisfies the first set of requirements comprises verifying whether the executing target code has violated a requirement associated with the particular host code responsible for hosting the execution of the target code.

15. The method of claim 10, wherein the managed information for the particular host code responsible for the particular code in the chain of executing code comprises a link to one or more components in the particular code that are stored on disk and that were used by the particular host code to load the particular code for execution.

16. The method of claim 10, wherein the managed information for the particular host code responsible for the particular code in the chain of executing code comprises a dynamic indication whether the particular code while executing has violated at least one internal constraint in the particular code.

17. A method of performing code authentication of code executing on an electronic device, the method comprising:
identifying a first requirement, stored in secured information in a first code that constrains a second code executing on the electronic device to code provided by a first authority and authorized, by the first authority, to perform a particular action, wherein the first code is responsible for hosting the execution of the second code;
identifying a second requirement, stored in secured information in the second code, that constrains the first code to code provided by a second authority and authorized, by the second authority, to perform a particular action;
obtaining identity information for the second code that identifies an authority of the second code and an action authorized, by the authority of the second code, to be performed by accessing the stored secured information in the second code on the electronic device;
determining (i) whether the second code satisfies the first requirement based on a comparison between the identity information and the first requirement and (ii) whether the first code satisfies the second requirement; and
providing a result of the determinations to the first code.

18. The method of claim 17, wherein the identity information for the second code comprises at least one of a constraint on subject code allowed to host execution of the second code, a constraint on subject code for which the second code is allowed to host execution, a constraint on a dynamic library with which the second code is allowed to be linked, and a constraint on a plugin the second code is allowed to load.

19. The method of claim 17, wherein the first authority is the same as the second authority.

20. The method of claim 17, wherein the first authority is different from the second authority.

21. The method of claim 17, wherein the identity information of the second code comprises a plurality of pieces of encrypted information, wherein a first piece of the plurality of pieces of encrypted information identifies the authority of the second code and a second piece of the plurality of pieces of encrypted information identifies the action authorized by the authority of the second code.

\* \* \* \* \*